United States Patent [19]
Henot

[11] Patent Number: 5,196,933
[45] Date of Patent: Mar. 23, 1993

[54] ENCODING AND TRANSMISSION METHOD WITH AT LEAST TWO LEVELS OF QUALITY OF DIGITAL PICTURES BELONGING TO A SEQUENCE OF PICTURES, AND CORRESPONDING DEVICES

[75] Inventor: Jean-Pierre Henot, Thorigne, France

[73] Assignees: Etat Francais, Ministere des PTT; Telediffusion de France S.A., both of France

[21] Appl. No.: 671,456

[22] Filed: Mar. 19, 1991

[30] Foreign Application Priority Data

Mar. 23, 1990 [FR] France .................................. 90 03926

[51] Int. Cl.$^5$ .......................... H04N 7/12; H04N 7/04
[52] U.S. Cl. .................................... 358/136; 358/133; 358/141
[58] Field of Search ................. 358/141, 142, 12, 133, 358/135, 136, 105, 93; 375/122

[56] References Cited

U.S. PATENT DOCUMENTS

| | | | |
|---|---|---|---|
| 3,980,830 | 9/1976 | Wendland et al. | 358/135 |
| 4,196,448 | 4/1980 | Whitehouse et al. | 358/135 |
| 4,745,474 | 5/1988 | Schiff | 358/133 |
| 4,797,742 | 1/1989 | Sugiyama et al. | 358/141 |
| 4,816,899 | 3/1989 | Strolle et al. | 358/12 |
| 4,881,241 | 11/1989 | Pommier et al. | 375/38 |
| 4,933,762 | 6/1990 | Guichard et al. | 358/133 |
| 5,029,002 | 7/1991 | Citta et al. | 358/141 |
| 5,055,927 | 10/1991 | Keesen et al. | 358/133 |

OTHER PUBLICATIONS

"Principles of Modulation and Channel Coding for Digital Broadcasting for Mobile Receivers", M. Alard and R. Lassalle, EBU Review—Technical No. 224 (Aug., 1987).

Primary Examiner—James J. Groody
Assistant Examiner—Safet Metjahic
Attorney, Agent, or Firm—Locke Reynolds

[57] ABSTRACT

An encoding and transmission method with at least two levels of quality of digital pictures, each digital picture being formed by at least one matrix of encoded picture elements, wherein each of the pictures is cut up into blocks of picture elements, a reversible mathematical transformation is applied to each of the blocks of picture elements, the coefficients of the transformed picture blocks are quantized and the quantized coefficients are encoded. The transformed coefficients are divided into at least two digital trains, the first train including basic coefficients enabling the reconstruction of a standard quality picture, and at least one second digital train including a set of complementary coefficients enabling the reconstruction of higher quality pictures, in combination with the basic coefficients of the first digital train and possibly the coefficients of other complementary digital trains, the digital trains being processed and/or used distinctly, during the encoding. This enables notably the transmission of digital images that can be received, on the one hand, by moving receivers, especially under difficult reception conditions and, on the other hand, by fixed receivers requiring high image quality.

7 Claims, 7 Drawing Sheets

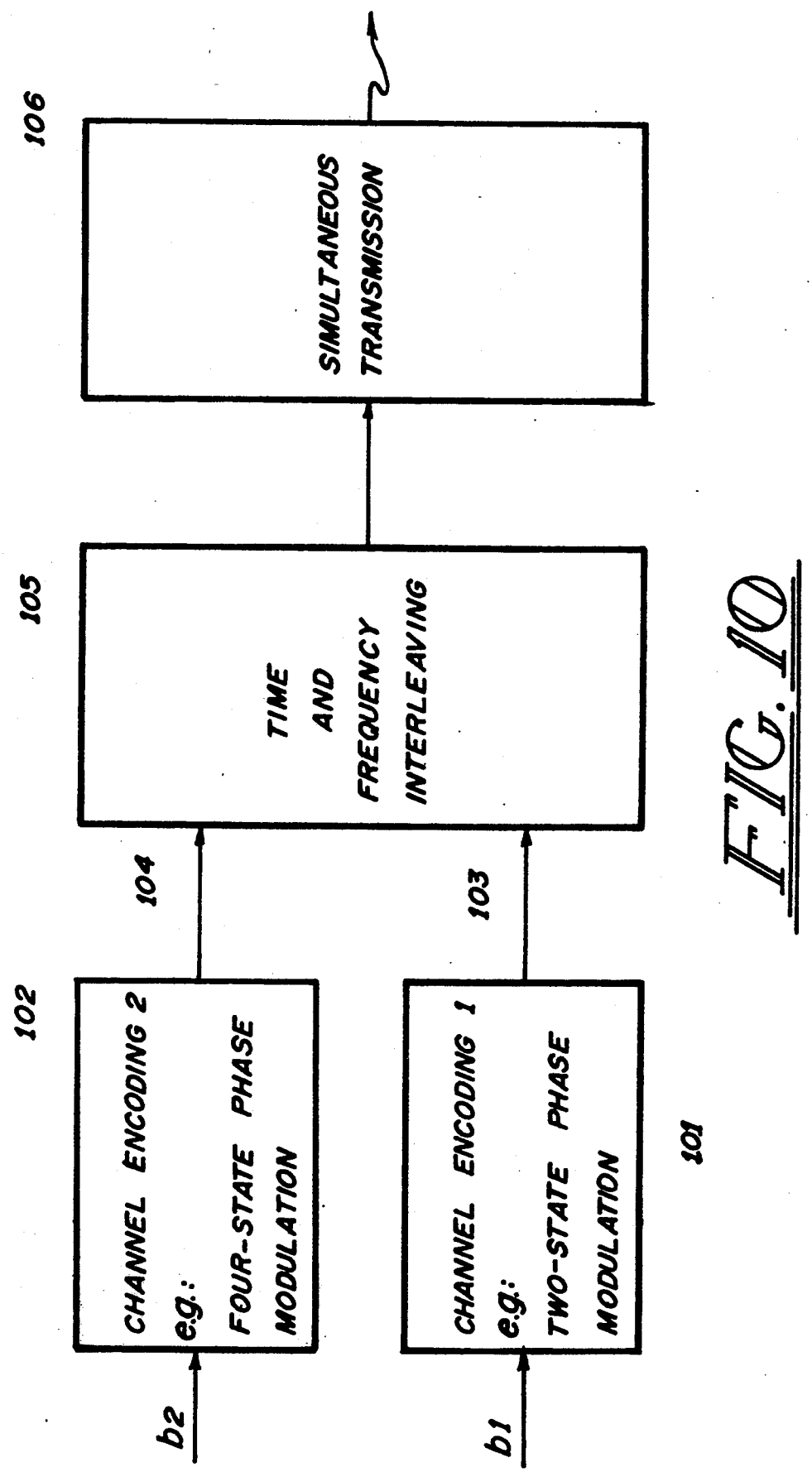

ENCODING AND TRANSMISSION METHOD WITH AT LEAST TWO LEVELS OF QUALITY OF DIGITAL PICTURES BELONGING TO A SEQUENCE OF PICTURES, AND CORRESPONDING DEVICES

BACKGROUND OF THE INVENTION

1. Field of the Invention

The field of the invention is that of the transmission of pictures in a digital channel.

The invention relates notably to the transmission of digital television signals, for example by radio link, where said signals can be received, on the one hand, by moving receivers, especially in difficult conditions of reception and, on the other hand, by fixed receivers requiring high picture quality.

The invention can be applied to any type of picture transmission, such as that of so-called standard television, corresponding to a picture format of the order of 720 by 575 pixels, high-definition television (HDTV) or visio telephony.

With the huge increase in the number of digital channels and their transparence to the data transmitted, the use of these channels for picture transmission is likely to increase substantially in the years to come.

However, this transmission of pictures on digital channels is not a trivial matter. For, the transmission bit rate of the different existing channels does not enable the transmission of moving pictures as such in real time.

2. Description of the Prior Art

There are many known bit rate reduction or encoding techniques. These techniques generally comprise three steps:

A step for representing the picture as compactly as possible by using the redundancies that exist in the picture or in the sequence of pictures;

A step for the quantization of this new representation;

A step for the assignment, to each quantized value, of a code word that will be transmitted and will enable the decoder to reconstruct the sequence of transmitted pictures.

These known encoding methods generally make it possible to obtain bit rates that enable the transmission of high quality pictures to fixed receivers. By contrast, the transmission channels and encoding methods used do not enable reliable reception in moving receivers, especially in urban conditions, i.e. in conditions of multiple propagation (Rayleigh process) generating phenomena of fading, and in the presence of parasitic noise and jamming.

Broadcasting to moving receivers therefore calls for the use of more reliable techniques of redundancy encoding and/or modulation, to the detriment of the number of pieces of information, hence to the detriment of the definition of the transmitted picture.

It is known, moreover, that the bit rate of the transmission channels is fixed while the data bit rate, following the encoding, is most usually variable. This requires the presence of a buffer memory element and regulation means that act on the encoding and, for example, on the quantization levels as a function of the rate with which this buffer memory is filled.

These regulation means have the drawback of acting without distinction on any coefficient to be transmitted, whereas it is known that some of these coefficients are more important than others, notably from the psychovisual viewpoint. Thus a coefficient that is less important as regards visual acuity, for example because it corresponds to a piece of information concerning a high spatial frequency, may be transmitted with high encoding definition if the buffer memory is scantily filled, while an essential coefficient of the same picture, arriving at a time when the buffer memory is saturated, will be encoded with a lower definition. In other words, information of little importance would then have been encoded normally, while information of greater relevance would have been under-coded.

The invention is designed to overcome these different drawbacks.

SUMMARY OF THE INVENTION

More precisely, an aim of the invention is to provide a method for the encoding and transmission of pictures enabling the reception of sequences of digital pictures in moving receivers as well as in fixed receivers with satisfactory picture quality for large-sized screens.

A complementary aim of the invention is to provide a method such as this using only one transmission channel.

Another aim of the invention is to provide a method such as this, the regulation of which preferably acts on the coefficients carrying information of little relevance.

Another aim of the invention is to provide a method such as this enabling the making of small-sized, low-cost receivers.

Another aim of the invention is to provide a method such as this enabling the making of means for the storage of pictures with at least two levels of quality.

These aims, as well as others that shall appear here below, are achieved according to the invention by means of an encoding and transmission method with at least two levels of quality of digital pictures, each digital picture being formed by at least one matrix of encoded picture elements, wherein each of said pictures is cut up into blocks of picture elements, a reversible mathematical transformation is applied to each of said blocks of picture elements, the coefficients of the transformed picture blocks are quantized and the quantized coefficients are encoded, wherein said transformed coefficients are divided into at least two digital trains, the first train including basic coefficients enabling the reconstruction of a standard quality picture, and at least one second digital train including a set of complementary coefficients enabling the reconstruction of higher quality pictures, in combination with said basic coefficients of the first digital train, and possibly the coefficients of other complementary digital trains, and wherein said digital trains are processed and/or used distinctly, during the encoding.

Thus, it is possible to reconstruct pictures with distinct quality levels, as a function of the binary trains that are used in the receivers.

Advantageously, said basic coefficients of the first digital train are transmitted with a level of protection against transmission errors that is greater than that used for the complementary coefficients of the second binary train or trains.

This provides, firstly, for the reliable reception of the data of the first digital train, even under difficult conditions, and notably in moving receivers and, secondly, for the transmission of the complementary data of the second train with greater efficiency in terms of bit rate. For, it is clear that the pieces of essential data, corresponding to the first train, are advantageously processed with greater quality and/or safety.

Preferably, said transformation is of the type giving transformed coefficients each representing a structure and a value of spatial frequency in the picture, said first digital train including essentially a first set of transformed coefficients corresponding to the low spatial frequencies, and said second digital train including a set of complementary transformed coefficients corresponding to the high spatial frequencies.

It is clear that the term "second digital train" refers to the complementary train, or to complementary trains should there be several of them.

In a preferred embodiment of the invention, said reversible mathematical transformation is a discrete cosine transform.

Advantageously, said coefficients of each transformed block are re-ordered according to a zigzag scanning of said transformed block, so as to order said coefficients according to a criterion of increasing spatial frequency.

In one particular embodiment of the invention, each of said digital trains corresponds to a predetermined bit rate.

Preferably, the same order coefficients of all the blocks of a picture are encoded before the encoding of the higher order coefficients.

This feature makes it possible to start by encoding all the elements important for the entire picture before encoding the less relevant elements. Thus, in the case of a bit rate problem calling for a reduction in the quantity of information to be transmitted, only the less important elements are affected.

In the case of methods carrying out a motion estimation and motion compensation, said motion estimation and compensation are carried out on the basis of the coefficients of the first digital train only, without taking account of the coefficients of the complementary digital train or trains. For, only these pieces of information are available in all the receivers.

The broadcasting of the digital trains is advantageously done by multiplexing in a common channel, specific synchronization words enabling the decoders to identify the beginning and the end of each of said digital trains.

In another embodiment, the method of the invention provides for the distribution of the data to be broadcast in the form of digital elements in the time-frequency space and the transmission of symbols each constituted by a multiplex of J orthogonal carrier frequencies modulated by a set of said digital elements and broadcast simultaneously, a set of said carrier frequencies being allocated to the broadcasting of each of said digital trains, and the carrier frequencies of each of said sets being modulated differently.

The transmission devices according to the invention advantageously include two buffer memories, the first buffer memory containing the data corresponding to said first digital train and the second buffer memory containing the data corresponding to said second digital train, the loading of said second buffer memory being carried out when the bit rate allocated to the first digital train is reached.

In the particular case of television signals including one luminance component and at least one chrominance component, the transmission devices may include at least two processing chains carrying out the transformation, quantization and separation of the coefficients of the transformed blocks into at least two digital trains, working in parallel, each of said chains being associated with one of said components.

The method of the invention enables the definition of at least two types of receivers and, notably, on the one hand, receivers of the mobile receiver or small-sized receiver type, having means for the reconstruction of standard quality pictures, by means of information transmitted by said first digital train only and, on the other hand, essentially fixed receivers having means for the reconstruction of high-quality pictures by means of information transmitted by said first digital train and at least one complementary digital train.

This distinction can also be made between different types of moving receivers, as a function of their screen size, and their processing capacity.

The method of the invention also enables the making of storage devices with at least two levels of quality of transmitted digital pictures, said devices having means for the recording on a data medium of digital pictures in at least two formats, corresponding to the basic digital train alone and to the association of said basic digital train with at least one of said complementary digital trains, and means for the selection of one of said recording formats.

BRIEF DESCRIPTION OF THE DRAWINGS

Other features and advantages of the invention shall appear from the following description of a preferred embodiment of the invention, given by way of a non-restrictive illustration, and from the appended drawings, of which:

FIG. 10 illustrates the distinct channel encoding of the two trains of the invention.

DETAILED DESCRIPTION OF THE INVENTION

Figure 1:
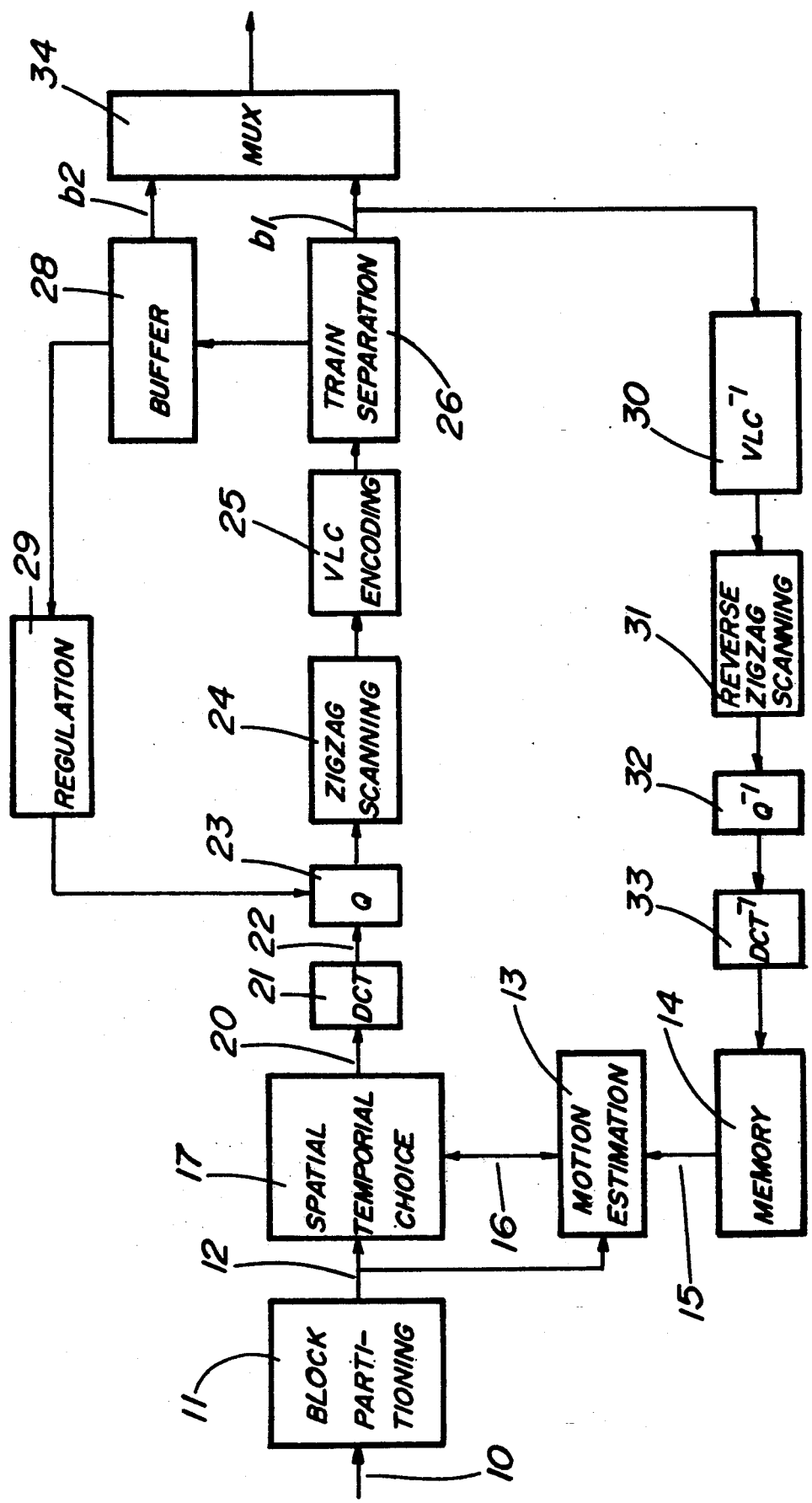
FIG. 1 is a block diagram of the encoding method of the invention, in the case of an encoding with two levels of quality.

The transmission of pictures by digital channels requires several steps. First of all, the picture has to be digitized. To this effect, there are standards laid down by broadcasting organizations, for example the CCIR recommendation No. 601. Then, the bit rate resulting from this digitization (216 Mbits/s in the case of the digital picture defined in the CCIR recommendation No. 601) has to be matched with the capacity of the channel. This matching of the bit rate corresponds to the encoding of the pictures at the transmitter and to their decoding at the receiver.

There are many known encoding techniques. Encoding or bit rate reduction is generally obtained in three steps. First of all, the picture has to be represented as compactly as possible by using the redundancies that exist in the picture or sequence of pictures. Then, this new representation of the picture has to be quantized, as a rule more approximately. Finally, each quantized value has to be assigned a code word which will be transmitted and will enable the decoder to reconstruct the sequence of pictures transmitted.

The reduction of the bit rate comes from all these different steps.

The first step is reversible, i.e. if the reverse operation is conducted, the original information is recovered. This is, for example, a predictive encoding prediction step (known as MICD) or a step for the transformation of the picture in encoding by time-frequency transformation.

In the case of predictive techniques, an attempt will be made to predict the value of each dot to be transmitted on the basis of the already transmitted dots, so that the decoder can work in a similar way. Then, the difference between the dot to be encoded and the predicted value is taken. This new value is called a prediction error. While there is substantially equal probability as regards the values of the dots of the picture to be encoded, the values of the prediction errors are far less numerous and are highly concentrated around the value 0. They therefore enable a encoding that is less costly in terms of bit rate.

With respect to the transformation techniques, the basic idea consists in taking a sub-picture of the complete picture and in subjecting this sub-picture to a reversible mathematical transformation such as for example the Fourier, Haar or Hadamard transforms. The value of this method is that, in the transformed space, the energy is distributed over a far smaller number of coefficients.

At present, the most commonly used transformation is the discrete cosine transform (DCT). One of the reasons for its use, in addition to its high efficiency characteristics in terms of compression, is the existence of an integrated circuit that computes this operation in real time for television, at a clock frequency of 13.5 MHz, on $4 \times 4$ to $16 \times 16$ sized blocks.

There is also the known method of sub-band encoding. This method is based on the partitioning of the original picture into frequency bands by means of banks of digital filters, such as mirror filters. This partitioning makes it possible to exploit the fact that the major part of the information is contained in the low frequency bands.

These different methods, as well as others, may be combined. It is possible, for example, to sub-divide the picture into blocks of 8 dots by 8 lines, then to make a temporal prediction for each of the blocks, as a function of the blocks of the preceding picture memorized and, finally, to carry out a discrete cosine transform on the blocks obtained by temporal difference or temporal prediction.

This type of encoding is called hybrid encoding.

The second step, which is the quantization step, is irreversible; a part of the information is definitively lost, but, preferably, it will be lost where the loss will be the least visible.

Quantization consists in the irreversible assigning of a single value, or representative value, to a set of values in a certain space, the precise value before quantization being then lost.

This assigning of representative values can be done systematically (fixed quantization) or variably as a function of the local context (adaptive quantization).

We can distinguish between mainly two types of quantization: scalar quantization in a one-dimensional space and vector quantization in a space with more than one dimension. Scalar quantization includes linear or uniform quantization and nonlinear quantization.

The third step, which is that of the assignment of code words to the quantized values, is also reversible. The bit rate may be reduced by the use of variable length codes that assign the shortest code words to the most frequent events. An example of this type of code is the Huffman code. In this case, short codes are assigned to the most frequently appearing values while, in contradistinction, the values that appear less frequently have a greater code word length. On an average, but at the cost of increased complexity, the bit rate is lower than that of a fixed-length code.

The most highly developed and most commonly used techniques at present implement the techniques of discrete cosine transform, motion estimation and compensation for temporal prediction and variable length codes.

Such systems are presently proposed for standardization in the transmission of digital television on channels at 34 Mbit/s and for 384 Kbit/s visioconference systems.

The system according to the invention is notably compatible with these standards.

FIG. 1 is a block diagram of the method of the invention, in a particular example including a discrete cosine transform, a motion compensation and a separation of the coefficients into two complementary digital trains.

It is quite clear that the invention is not limited to this method but covers all encoding methods that implement this kind of a separation of the coefficients to be transmitted into two or more digital trains.

The digital video signal 10 to be transmitted undergoes a first step 11 of being put into blocks 12, on the basis of the linewise analysis of the picture. These blocks 12, in the embodiment described, have a size of 8 dots by 8 lines.

A motion estimation step 13 is used to make a search, among the blocks 15 of the previous picture stored in a memory 14, for the best correspondent of the block 12 to be encoded, the search being made according to a certain criterion. This is therefore a prediction of a current block 12 as a function of the previous block 15, which may notably be a motion-related prediction, better known as "block matching".

Then, the difference 16 between the block 12 to be transmitted and the estimated value of this block is computed.

A step 17 for making a choice between the spatial block 12 and the difference 16 (or temporal block) makes an a priori selection of the block containing the lowest energy. The indication of choice 19 is transmitted to the decoder, as are the motion vectors, if any, associated with the blocks. It is clear that, if the prediction criterion of the step 13 is effective, the difference 16 contains little information. It is therefore more economical in terms of bit rate to transmit only this difference 16. However, in certain cases, the spatial block 12 contains less information to be transmitted than the temporal block 16, notably during the transitions.

The selected block 20 then undergoes a reversible mathematical transformation. In the preferred embodiment described, this transformation 21 is a discrete cosine transform. It is also possible to use many other transforms, for example but not exclusively, the Hadamard, Haar or Fourier transforms. The coefficients 22 of the transformed matrix are then quantized (step 23).

This transformation 21 gives a matrix of coefficients corresponding to picture structures with variable frequencies. Thus, the first coefficient corresponds to a uniform block structure. It has a value equal to the mean value of the block before transformation.

The coefficients of the first line correspond to increasing horizontal spatial frequencies, and those of the first column correspond to increasing vertical spatial frequencies. The last coefficient of this matrix corresponds to a checker-board with 64 squares.

It is known that the sensitivity of the human eye decreases when the spatial frequency of the structures increases. Furthermore, since small screens have a limited spatial resolution, the transmission and use, by these receivers, of information concerning the high order spatial structures is of no value. It is also known that the energy of the coefficients decreases very swiftly with their spatial frequency, notably because of the processed pictures. Thus, small checker-boards are rarely found in nature.

It can thus be seen that it is very advantageous to separate the coefficients to be transmitted into two binary trains b1 and b2, and to process these two trains distinctly. The binary train b1 will contain the values of the elements corresponding to the structures with the lowest frequencies, up to the L order coefficients determined by the bit rate of the binary train b1, and the binary train b2 will contain the L+1 to m order elements.

Thus, two types of receivers may be defined: simple, small-sized receivers using only a part of the transmitted information, corresponding to the digital train b1, with a high level of protection, enabling reception in difficult conditions, and notably in mobile receivers, and more sophisticated receivers, using all the useful data of the channel, i.e. data corresponding to the two binary trains b1 and b2.

The pieces of data of the second binary train b2 contain information of lesser importance in terms of psychovisual analysis. This information can therefore be transmitted with a lower level of protection than that used for the train b1, without thereby having any major adverse effects on reception. It is thus possible to achieve a comprehensive increase in the transmission bit rate, without damaging the quality of the transmission of essential information (train b1).

Figure 9:
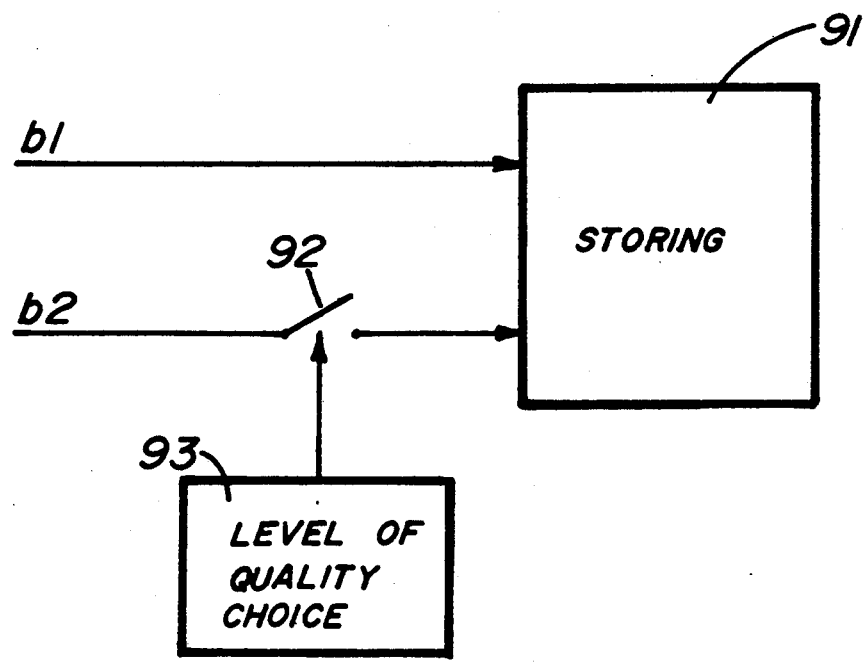
FIG. 9 is a block diagram of storage means according to the invention.

This separation into two binary trains also enables the defining of novel storage means, notably of the video tape recorder or optic disk type, with two levels of quality, as illustrated by FIG. 9 in storing means 91. The binary trains b1 and b2 can be taken from the outputs of demultiplexer 51, shown in FIG. 6. For, depending on the required level of quality, it is possible to memorize either the first binary train b1 alone or both the binary trains b1 and b2, at the cost of a higher consumption of memory space. In other words, pictures for which the quality is of little importance may be stored in keeping only the essential information of the binary train b1, thus reducing the space occupied on the medium, while high-quality pictures will be memorized completely.

Means 93 for selecting the type of recording desired (standard quality or high quality recording) will allow the user to specify his choice. This selecting means 93 controls a switch 92, which enables or disables the storage of the train b2.

It is quite obviously possible, in the same way, to separate the information to be transmitted into more than two binary trains, corresponding to as many quality levels and, hence, to as many types of receivers.

To this end, the coefficients must be sorted out according to their character of importance. In the example described, a change is made in the scanning 24 of the reading of the coefficients, so as to order them according to a psychovisual criterion of increasing horizontal, vertical or diagonal spatial frequencies.

Figures 2, 4:
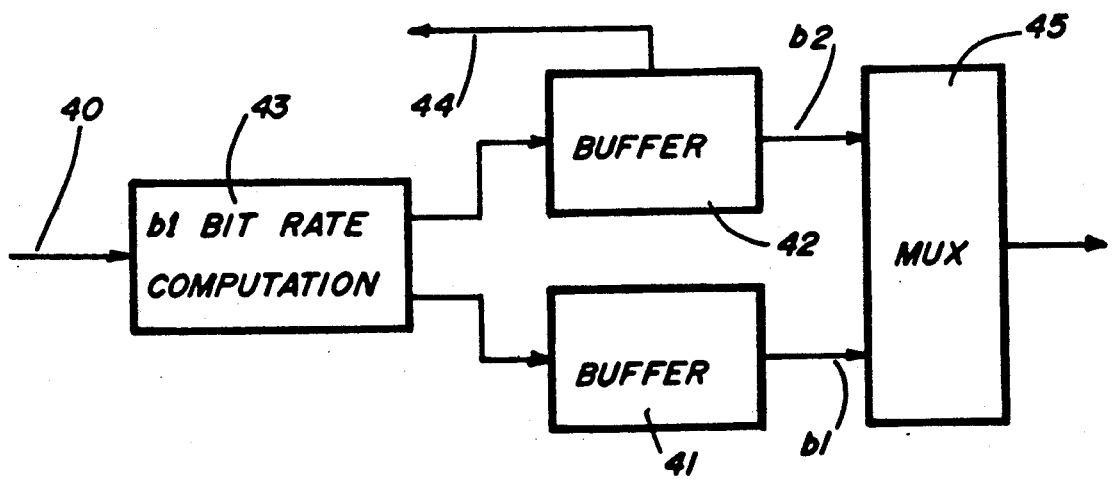
FIG. 2 illustrates the scan changing principle of the method according to FIG. 1.
FIG. 4 illustrates the principle of separation of the two binary trains of the method of FIG. 1.

FIG. 2 illustrates the zigzag scanning mode used, which is known per se. To each element, there is assigned an order number corresponding to the order in which the coefficients will be encoded. This order therefore represents the order importance of the coefficients, according to the psychovisual criterion related to the spatial frequency in the block.

Figure 3:
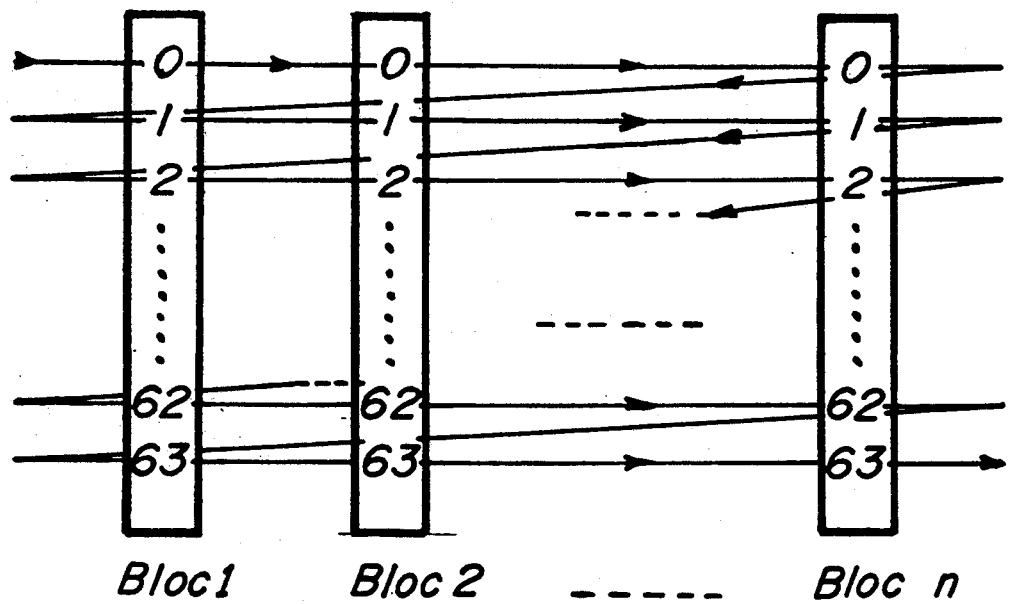
FIG. 3 illustrates the order of transmission of the coefficients forming a picture.

All the same order elements in all the blocks of each picture will be encoded before the higher order elements. The term "order" refers to the order number assigned to each coefficient successively taken into account in the zigzag scanning (see FIG. 2). More specifically, each block after DCT transformation is read in the order defined by the scanning 24 and each element of the block is stored in a memory specific to the order of the element in the block. When all the blocks of the picture are described, the memories are re-read in rising order. As shown in FIG. 3, the method therefore starts with the encoding of all the 0 order coefficients for the n blocks constituting the picture, then the 1 order coefficients, and so on and so forth. This enables the encoding, for each picture, firstly of the entire first binary train b1, then the second binary train b2.

The encoding step 25 assigns a code word to each quantized coefficient. This code word may advantageously be a variable length code, for example a Huffman code.

Then, the two binary trains b1 and b2 are subjected to the separation 26, the principle of which is explained further below in relation to FIG. 4. The two binary trains are then multiplexed by a multiplexer 34 and then sent out.

The method may include a regulation step 29 wherein the elements of the encoding and the quantization in particular are modified so that the buffer 28 neither overflows nor gets emptied. The regulation block also gives the quantization a regulation factor that is transmitted to the decoder. This regulation takes account only of the element s of the binary train b2. Thus, this regulation affects only coefficients of little importance. The essential coefficients of the binary train b1 are never under-coded.

To carry out the motion compensation, it is necessary to carry out a picture reconstruction that is identical to the one that will be made in the decoders in such a way that, in the memory 14, there are blocks of pictures identical to those used by the decoders.

This reconstruction therefore includes the following steps: decoding 30, reverse scan changing 31, reverse quantization 32 and reverse transformation 33.

This reconstruction is done solely on the basis of the binary train b1, for it is the only information available in both types of decoders.

Figure 8:
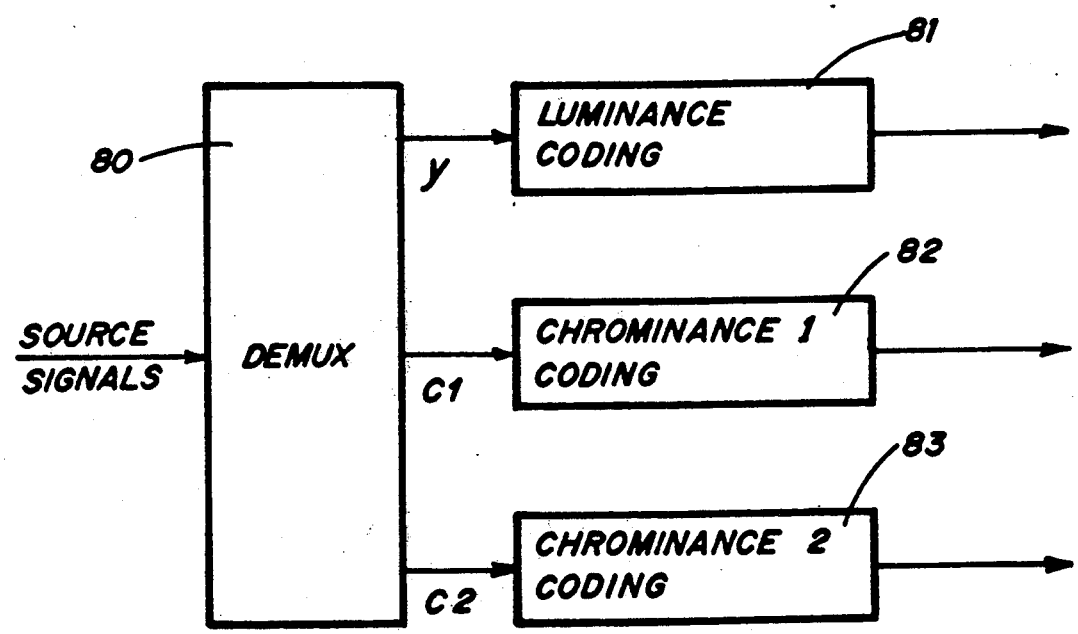
FIG. 8 is a block diagram of a coder processing several components in parallel.

The above-described processing applies to only one component of a video signal, such as the luminance signal. Advantageously, as illustrated by FIG. 8, the method may include several identical chains, 81, 82, 83 each acting in parallel on a component Y, C1 or C2 of the signal classically delivered by a demultiplexer 80. Thus, such chains 82, 83 may be used for each of the chrominance signals C1, C2. It is also possible to consider separating the sound signal into two binary signals.

FIG. 4 shows the principle of separation of the two binary trains b1 and b2. The transformed and encoded coefficients 40 are directed towards one of the two buffer memories 41 and 42, corresponding to each of the binary trains b1 and b2, by a module 43 for the computation of the bit rate associated with the train b1. When the bit rate allocated to this binary train b1 is reached, the following data is written in the second buffer 42. The filling rate 44 of this buffer 42 controls the regulation module 29 of FIG. 1.

The pieces of data corresponding to the two binary trains are then re-read synchronously, at the channel rate, and are multiplexed (45).

Figure 5:
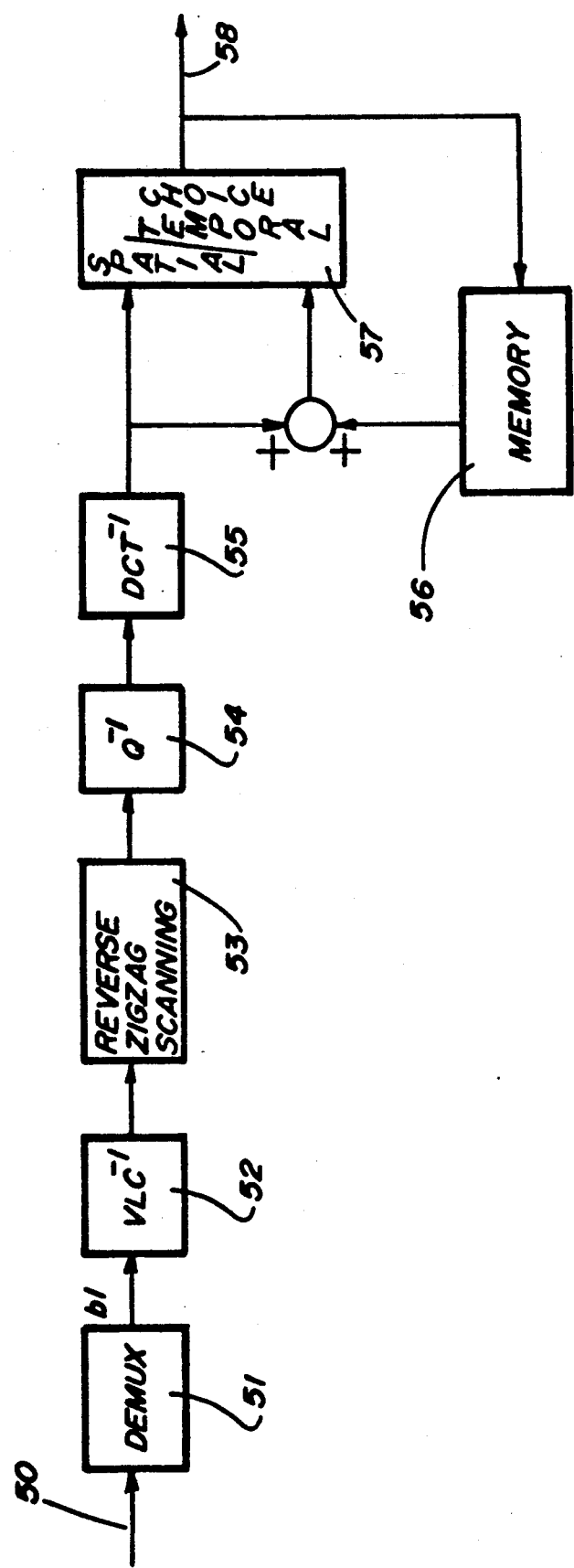
FIG. 5 is a block diagram of a simple decoder using only the first binary train.

FIG. 5 is the diagram of a simple decoder. It finds application notably in mobile receivers and in small-sized receivers. This type of decoder uses only the information of the binary train b1.

It therefore has a demultiplexer 51 that extracts the binary train b1, as well as the assistance data needed for the reconstruction of the picture, such as the indications of choice and the motion vectors from the transmitted signal 50.

The binary train b1 is successively subjected to the decoding module 52 and the reverse scan changing module 53 so that the coefficients are re-arranged in blocks, the reverse quantization module 54 and the reverse transformation module 55. The reconstructed values 58 are stored in the memory 56 for use during the motion compensation step after the addition, if necessary, of the shifted block of the previous picture to the choice module 57.

Figure 6:
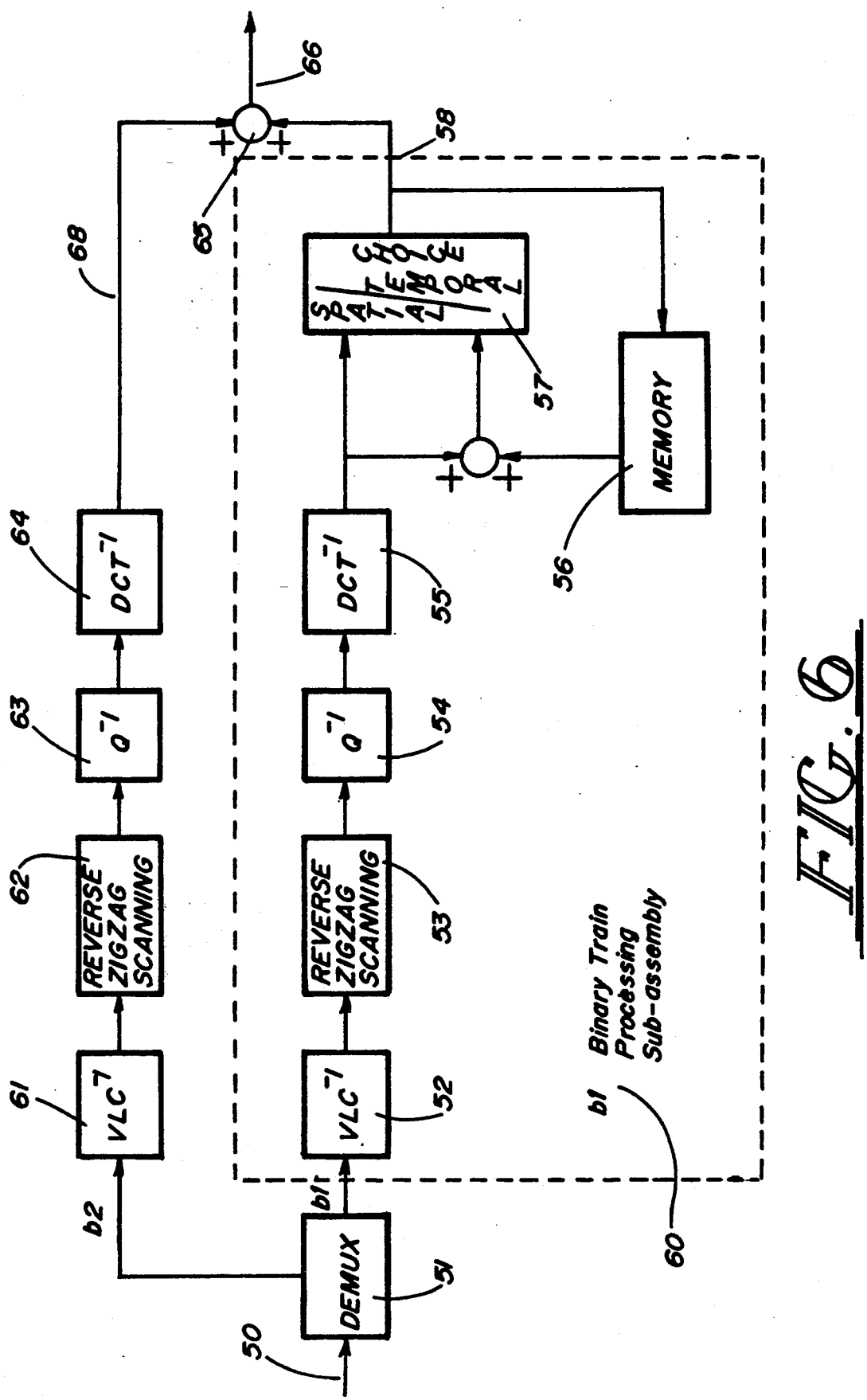
FIG. 6 is a block diagram of a complete decoder, using two binary trains.

FIG. 6 is a block diagram of a complete decoder using the two binary trains b1 and b2. A decoder such as this corresponds notably to receivers for domestic applications, under better conditions of reception and/or with bigger screens.

The sub-assembly 60, comprising modules 52 to 57, processes the first binary train b1 in a manner identical to the processing done in a simple decoder, as has been described in relation to FIG. 5. It will be noted, in particular, that the motion compensation is achieved by using only the data reconstructed from of the train b1.

The demultiplexer 51 also extracts the binary train b2 from the received signal 50. This binary train b2 undergoes a similar processing: decoding 61, reverse scan changing 62, reverse quantization 63 and reverse discrete cosine transform 64. The binary train b2, for its part, after decoding and reverse DCT transformation, recovers a complementary information which, when added to the information corresponding to the binary train b1, makes it possible to obtain a higher quality picture.

The pieces of data 58 and 68 coming from the two trains are summed up in an adder 65, giving a video signal 66 taking account of all the transmitted information.

Should the encoding method include several processing chains working in parallel on several components of the signal to be transmitted, the decoders obviously include the same number of decoding chains. Such a receiving device could, for example decode the broadcast signals in a manner like that diagrammatically shown in FIG. 8 including one luminance component Y, and a plurality of chrominance components C1, C2.

Besides, it is possible to envisage the making of receivers that automatically select the binary trains to be used, for example on the basis of criteria such as the speed of movement or the error rate at reception. Thus it is possible, in one and the same receiver, to receive a high quality picture when conditions permit it, and also, under more difficult conditions, a picture that is of lower quality but is without r disturbance.

In a particular embodiment, the two binary trains b1 and b2 may be multiplexed in a common channel. Specific binary words, or synchronization words, are transmitted in order to indicate the start and the end of the binary trains b1 and b2 to the decoder.

Another advantageous technique entails the use of a COFDM (Coding Orthogonal Frequency Division Multiplex) as described in the French patent applications No. 86 09622 dated Jul. 2, 1986, and No. 86 13271 dated Sep. 23, 1986 filed on behalf of the present Applicant and corresponding U.S. Pat. No. 4,881,241. An advantageous application of COFDM encoding, compatible with the present invention, is also described in a joint patent application filed on the same date on behalf of the present Applicant.

This digital broadcasting system is based on the combined use of a channel encoding device and a method of modulation by orthogonal frequency multiplexing.

The modulation method proper of this known system makes it possible to do away with the problems related to the frequency selectivity of the channel. This method consists in the distribution of constituent digital elements of the data signal in the frequency-time space f-t and in the simultaneous transmission of the sets of digital elements on J parallel broadcasting channels by means of a frequency multiplex using orthogonal carriers. In particular, this type of modulation makes it possible to prevent two successive elements of the data train from being transmitted at the same frequency.

The known encoding process is aimed, on the whole, at enabling the processing of the samples coming from the demodulator to absorb the effect of the variations in amplitude of the received signal, due to the Rayleigh process. The encoding is advantageously a convolutive coding, possibly concatenated with a Reed-Solomon type of coding. The decoding may advantageously be a Viterbi soft decision type of decoding.

In a known way, the encoded digital elements are furthermore interlaced in time and in frequency, so as to maximize the statistical independence of the samples with respect to the Rayleigh process and the selective character of the channel.

This system therefore enables the broadcasting of digital signals in channels to which there are assigned multiple paths having characteristics that vary in time. In particular, it enables the efficient reception of digital data in mobile receivers in an urban environment.

Figure 7:
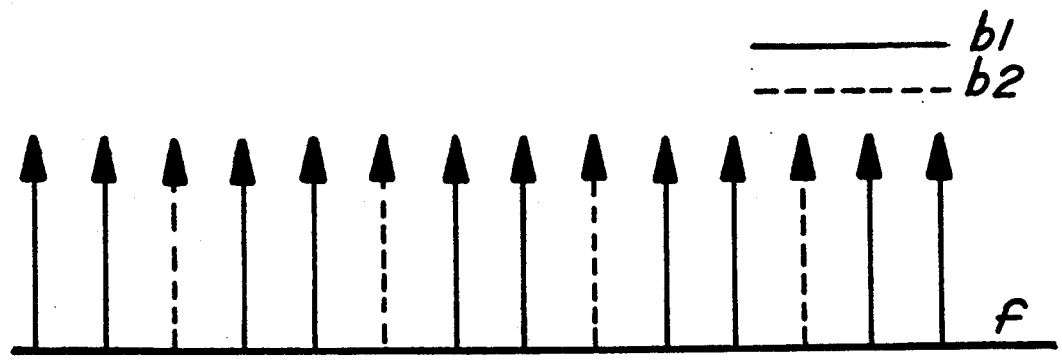
FIG. 7 illustrates diagramatically the sets of carrier frequencies used to broadcast the distinct binary trains.

In this case, it is possible to assign a particular set of carrier frequencies to each of the binary trains b1 and b2, as shown in FIG. 7. Thus, the simple decoders have means to decode the carrier frequencies of only the set corresponding to the first binary train b1. By contrast, the complete decoders decode all the J carrier frequencies.

As illustrated on FIG. 10, the carrier frequencies of the first set corresponding to the binary train b1 are channel encoded (101) more reliably than those of the second set corresponding to the second binary train b2 (102). For example, the carriers of the first set could be modulated according to a two-state phase modulation, while the carriers of the second set, which will be received only by fixed carriers, hence under easier conditions of reception, will be modulated according to a modulation with four or eight states. These latter carriers may therefore carry many more pieces of information. By contrast, their channel encoding will prove to be less reliable. As described before, the two trains 103, 104 are then interleaved in time and in frequency (105) and broadcast.

For example, a method such as this may enable the transmission of the binary train b1 at a bit rate of between 2.5 and 5 Mbits/s, and the second binary train b2 at a bit rate of 5 Mbit/s. Bit rates such as these enable the transmission of pictures according to the standard 4:2:2, i.e. with a resolution of 720 dots×625 lines, at a rate of 25 pictures per second.

What is claimed is:

1. An encoding and transmission method with at least two levels of quality of digital pictures made of picture elements, the method comprising the steps of:

partitioning each of said digital pictures into blocks of picture elements;

applying a reversible mathematical transformation to each of said blocks of picture elements to form transformed blocks of transformed coefficients corresponding to a distinct spatial frequency in the corresponding block of picture elements;

quantizing said transformed coefficients to form quantized coefficients;

encoding the quantized coefficients to form encoded coefficients;

distributing said encoded coefficients into a first and at least one second digital trains of encoded coefficients, each of said trains having a beginning and an end, the first digital train including basic coefficients corresponding to lower spatial frequencies, and at least one second digital train including a set of complementary coefficients corresponding to higher spatial frequencies;

channel encoding the encoded coefficients of said first digital train with a first level of protection against transmission errors to form a first series of data elements to be broadcast;

channel encoding the encoded coefficients of said at least one second digital train with a second level of protection against transmission errors to form at least one second series of data elements to be broadcast, said first level of protection being greater than said second level of protection;

multiplexing said channel encoded digital trains in a common channel utilizing specific synchronization words in the common channel to enable the ready identification of the beginning and the end of each of said digital trains, said digital trains being broadcast at a fixed rate relative to each other.

2. An encoding and transmission method with at least two levels of quality of digital pictures made of picture elements, the method comprising the steps of:

partitioning each of said digital pictures into blocks of picture elements;

applying a reversible mathematical transformation to each of said blocks of picture elements to form transformed blocks of transformed coefficients;

quantizing said transformed coefficients to form quantized coefficients;

encoding the quantized coefficients to form encoded coefficients;

distributing said encoded coefficients into a first and at least one second digital trains of encoded coefficients, the first digital train including basic coefficients corresponding to lower spatial frequencies, and at least one second digital train including a set of complementary coefficients corresponding to higher spatial frequencies;

channel encoding the encoded coefficients of said first digital train with a first level of protection against transmission errors to form a first series of first data elements to be broadcast;

channel encoding the encoded coefficients of said at least one second digital train with a second level of protection against transmission errors to form at least one second series of second data elements to be broadcast, said first level of protection being greater than said second level of protection;

providing a plurality of orthogonal frequency carriers to be simultaneously broadcast;

distributing said plurality of orthogonal frequency carriers into a first and at least one second distinct sets of frequency carriers;

modulating each of the frequency carriers of said first set of frequency carriers with distinct data elements picked up out of said first series of first data elements so as to time and frequency interleave all said first data elements in such a way to prevent two successive data elements of said first series of first data elements from being transmitted on a same frequency carrier of said first set of frequency carriers;

modulating each of the frequency carriers of said at least one second set of frequency carriers with distinct data elements picked up out of said at least one second series of second data elements so as to time and frequency interleave all said second data elements in such a way to prevent two successive data elements of said second series of second data elements from being transmitted on a same frequency carrier of said second set of frequency carriers;

simultaneously broadcasting the plurality of modulated orthogonal frequency carriers, each of said digital trains being broadcast at a fixed rate relative to each other.

3. A method according to any of the claims 1-2 wherein said reversible mathematical transformation is a discrete cosine transform.

4. A method according to any of the claims 1-2 further comprising a step of re-ordering the transformed coefficients of each block according to a zigzag scanning of said block, so as to order said transformed coefficients according to a criterion of increasing spatial frequency.

5. A method according to any of the claims 1-2 further comprising the step of controlling said step of quantizing, said step of controlling taking into account and acting only on the coefficients of said second digital train wherein each of said digital trains corresponds to a predetermined bit rate.

6. A method according to any of the claims 1–2 further comprising the step of a re-ordering the transformed coefficients of all the blocks of a picture by grouping all same order coefficients of all the blocks, the order of a transformed coefficient corresponding to a structure and a value of spatial frequency so that the same order transformed coefficients of all the blocks of a picture are quantized before the quantizing of the higher order transformed coefficients which have an order corresponding to higher spatial frequencies.

7. A method according to any of the claims 1–2 further comprising the step of carrying out a motion estimation and motion compensation on the basis of the basic coefficients of the first digital train only, without taking account of the complementary coefficients of the second digital train or trains.

* * * * *